May 8, 1956 H. ANTRANIKIAN 2,744,953

COLOR TELEVISION SYSTEMS

Filed Jan. 28, 1952 2 Sheets-Sheet 1

INVENTOR.
HAIG ANTRANIKIAN
BY
Singer & Kennedy
ATTORNEYS.

May 8, 1956 H. ANTRANIKIAN 2,744,953

COLOR TELEVISION SYSTEMS

Filed Jan. 28, 1952 2 Sheets-Sheet 2

INVENTOR.
HAIG ANTRANIKIAN
BY
Sawyer & Kennedy
ATTORNEYS.

2,744,953
Patented May 8, 1956

2,744,953

COLOR TELEVISION SYSTEMS

Haig Antranikian, Lakewood, N. J.

Application January 28, 1952, Serial No. 268,610
9 Claims. (Cl. 178—5.2)

This invention relates to improvements in color television systems. More particularly, the invention is concerned with systems of the type in which a camera or picture tube is provided with a photosensitive or phosphorescent screen having a large number of parallel narrow strips for responding to or reproducing a number of component colors.

It is an object of the invention to provide a color synchronizing system in a television transmitting or receiving apparatus of the character indicated, whereby exact color tracking may be obtained with apparatus and circuits of a simple character.

In my previous application, Serial No. 251,933, filed October 18, 1951, for Color Television Systems, I have described a system in which color synchronizing pulses derived from the scanning of a photosensitive or phosphorescent screen by the electron beam itself are utilized for switching the video output so as to produce and reproduce desired color components in a desired order. The present application is directed to a modification or improvement on the system there disclosed, in which the movement of the electron beam itself is controlled in accordance with its own motion across the photosensitive or phosphorescent screen, causing the beam to dwell upon strips corresponding to the desired component colors in a predetermined order and sequence. Such system may be used independently or may be combined with the control of video output according to my said prior application, or with a blanking or suppression of the electron beam, as desired.

A color television system embodying the invention in a preferred form will now first be described with reference to the accompanying drawing, and the features forming the invention will then be pointed out in the appended claims.

Figure 1:
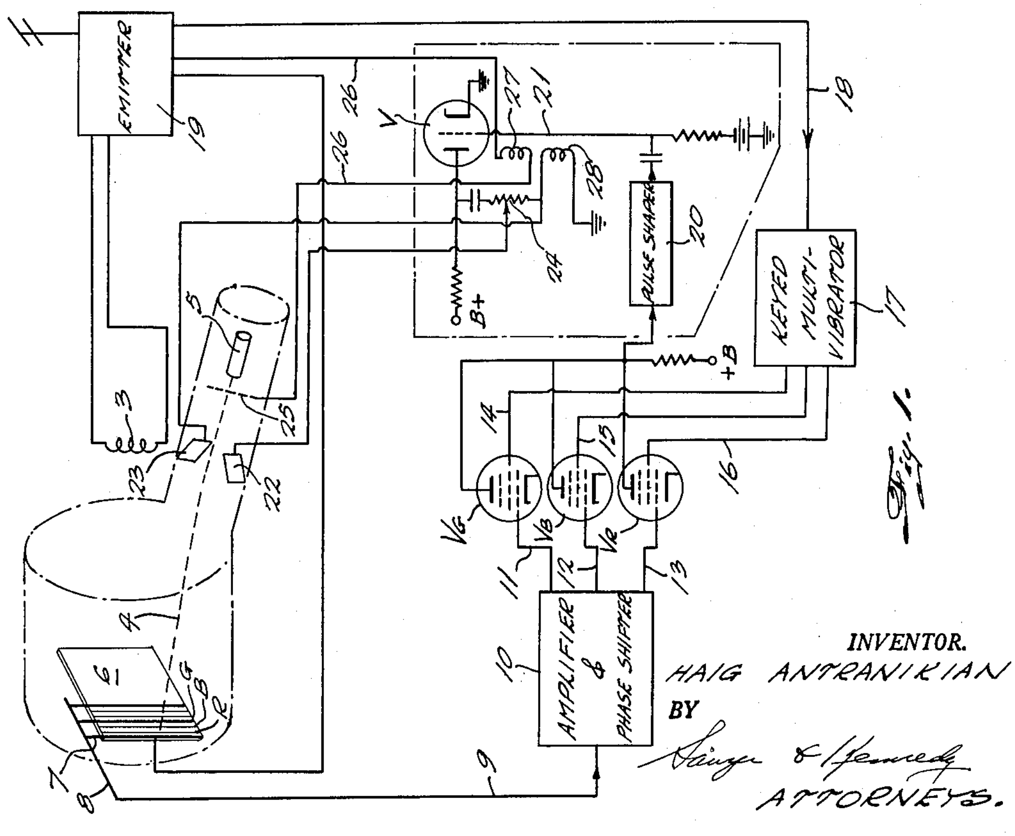
Figure 1 is a schematic of a transmitting system embodying the invention in a preferred form.

In Figure 1 there is indicated in phantom at 1 an iconoscope or camera tube, with which there is associated a horizontal deflection coil, indicated schematically at 3, causing the horizontal movement of the electron beam 4 emitted by a cathode 5 across a photosensitive screen assembly, indicated generally at 6.

The screen comprises a number of parallel strips R, B and G, for responding to the component colors selected, which may be of any suitable desired number and color. For simplicity, it will be assumed that there are three component colors, and that they will be identified as red, blue and green, in accordance with the usual practice. The red, blue and green strips are repeated cyclically across the screen in the desired number, which, in the usual system, may be about 460 sets of strips, each set including a red, blue and green strip. There is associated with each set of strips a conductor 7 extending parallel to the strips and either lying on or incorporated into the surface of the screen, these strips forming an electrical grid and being connected to a common terminal 8. Voltage developed in the grid elements 7 is utilized in a manner explained hereinafter, for controlling the color synchronization.

The details of a suitable screen and grid structure are in general well known in themselves, and as they are described more particularly in my aforementioned application, such details will not be repeated herein.

The voltage developed in the conductor 8 is applied through a connection 9 to the input of an amplifier and phase shifter, indicated in block form at 10, shown and described more in detail in my aforementioned application, and which develops output signals applied through conductors 11, 12 and 13 to control grids of the vacuum tubes V*b*, V*g* and V*r*. There is also applied to a second control grid of each of these tubes through the connections 14, 15 and 16 a color shifting signal from the keyed multivibrator, indicated in block form at 17, and which is controlled through connection 18 by synchronizing signals taken from the emitter, indicated in block form at 19. It will be understood that the emitter indicated at 19 includes the usual circuits for amplifying and transmitting the video signal as well as the circuits for developing the horizontal and vertical sync pulses and blanking pulses. Since these pulses may, in general, be similar to those developed and used in the present standard signal, apart from modifications which will be obvious, description of these known circuit elements is omitted herefrom.

The tubes V*g*, etc. are connected and arranged so as to pass a signal only when positive signal is applied to both the grids mentioned. The particular tube which is to develop output at any given instant is selected by means of the signal from the multivibrator 17, and it will develop output only in accordance with the signal supplied by the amplifier and phase shifter 10. The output of the tubes V*g*, etc. is passed to a pulse shaper, indicated in block diagram form at 20. The pulse output therefrom is communicated through connection 21 to control grid for the vacuum tube V. The output of this tube is applied across deflection electrodes 22 and 23 of the iconoscope 1 and serves to regulate the movement of the electron beam as later described.

The deflecting effect of the electrodes 22 and 23 may be regulated as by adjusting the setting of potentiometer 24. Blanking voltage may also be applied to the grid 25 of the iconoscope 1, by inserting in the line 26 leading thereto a secondary 27 of a transformer having its primary 28 included in the plate circuit of the tube V, as indicated.

A great variety of different types of color synchronization and of color shift sequences may be employed, as indicated in detail in my prior application above referred to. For simplicity, it will be assumed that the system used is line sequential and that all red strips of a given line will be scanned or transmitted, all blue strips of the next line and all green strips of the following line, this action being repeated with suitable interlace so that when the first line is again scanned, the blue strips will be transmitted instead of the red and so on. For such system, it is appropriate that the voltages in the conductors 11, 12 and 13 consist of three phase pulses corresponding in frequency to the scanning of the grid conductors 7 by the electron beam, in duration to approximately one third of the time required for the electron beam to pass from one conductor 7 to the next, and that they be displaced in phase by approximately 120° or corresponding to the spacing of the strips R, B and G, if not of equal widths. The pulses supplied by the keyed multivibrator 17 will be of duration corresponding to the time required to scan one line of the screen and will likewise be displaced 120° in phase.

There may thus be produced in the input to the pulse shaper 20, during the scanning of any line, a succession of pulses in accurately timed relationship to the passage of the electron beam 4 across a grid conductor element 7, the phase or the time of commencement of the input pulse varying, however, in accordance with which of the tubes V*r*, etc. is active at the time. The pulse shaper 20 may produce a pulse of sawtooth or other desired form having a duration corresponding to the desired fraction, as, for example, 90%, of the time required for the electron beam to pass from one grid element 7 to the next under control of the horizontal deflection coil (or electrodes, if electrostatic deflection is used) 3. The circuits are arranged so that this pulse produces an output voltage from the tube V across the electrodes 22 and 23, which produces a field, the strength of which varies at the same rate as the field of the deflecting coil 3, but in the opposite direction. This balances and nullifies the effect of the flux of the deflection coil 3, so that during the duration of a pulse, the movement of the beam is stopped. It will be apparent that by a suitable adjustment of phase of the signals, and of the lag and lead thereof, the movement of the beam may be stopped so that it will rest on a strip of desired color during the duration of the pulse.

As the voltage drops from maximum to minimum value between pulses, the deflector plates 22 and 23 will, of course, operate to accelerate the movement of the beam, assisting the deflection coil 3 rather than opposing it, and restoring the required average rate of travel of the beam across the screen. At the same time, the changing current through primary 28 induces a voltage, applied to grid 25 through line 26, which may be utilized, where desired, to blank the electron beam during the movement to the corresponding strip of the next set of strips. Since the beam stopping portion of the sawtooth pulse will be of comparatively long duration (as, for example, 90% or so of the entire pulse interval), the circuit constants may readily be selected so as not to affect the grid 25 to any objectionable extent during the stopping of the beam.

It will be apparent that the system of the present invention is characterized by an absolute locking of the color tracking of the tube and that the lag, lead and frequency may readily be adjusted to produce perfect synchronism without affecting or upsetting any other circuits involved in the transmitter.

The foregoing description is based on the supposition that the slope of the beam stopping pulse is equal to that of the horizontal sweep sawtooth, but opposite in sign. While this relation is ordinarily preferred, the invention may also be applied utilizing a variety of other forms of pulse. For example, the pulse may be of less slope than the sweep sawtooth, causing the beam to decelerate so as dwell predominantly on the desired strip. It is also possible with higher slope of the pulse to cause some retrograde movement of the beam. In particular, variation in circuit components from time to time may be expected to change the relation of the pulse wave form to that of the sweep sawtooth, and it will be apparent that the system is capable of tolerating such changes as may be expected to occur, so that the operation is in no way critical.

While the system has been described as applied to a camera tube of the iconoscope type in which the photosensitive screen is scanned directly by the electron beam, it is also applicable to camera tubes, typified by the so-called image orthicon tube, in which the photosensitive screen is scanned indirectly, the electron beam sweeping across an electronic image of the picture on the screen and formed on an intermediate target. In such case, it will be preferable to utilize augmented video signal for one of the component colors (which may be produced by auxiliary lighting, as explained in my aforementioned application) for producing the color synchronizing signal, instead of a grid or similar expedient cooperating with the screen. As will be apparent, this type of color synchronizing signal may also be used with direct scanning of the photosensitive screen. Within the scope of the invention, any of these expedients for generating pulses in the electron beam itself as it scans the various color strips directly or indirectly may be used and without affecting substantially the operation of the system. With most methods of generating the color synchronizing pulse, it will be found desirable not to blank the electron beam entirely during its movement between pauses, but to maintain a sufficient beam strength for pulse generation while reducing the beam strength sufficiently to avoid undesired video signal for color reproduction. As will be understood, in many cases no reduction whatever in the beam strength may be required, the reduction of video output involved in speeding up the movement across unwanted strips being entirely sufficient.

While the system has been described as utilizing an electronic switching system, in which one of the tubes V*r*, etc. is made conductive while the other two are made non-conductive, it will be apparent that this operation may be reversed. In such case, for example, in scanning a given line the red and blue component strips of each set may produce video output while the video output of the green strip is suppressed. The color omitted changing in the course of the scanning according to the desired sequential system, instead of the color transmitted, and the pulse supplied to the electrodes 22 and 23 being varied to suit the sequence and type of transmission desired.

The system has been described with reference to a camera tube utilizing magnetic deflection for the line sweep, and electrostatic auxiliary deflection for stopping or controlling movement of the electron beam for color selection. As will be apparent, the substitution of electrostatic line sweep deflection would make no significant change in the system, nor would the substitution of electromagnetic auxiliary deflection. In some cases, it may be preferred to apply the color selecting or auxiliary deflection voltage or current to the line sweep deflection coils or electrodes themselves, and this may also be done in appropriate cases.

Figure 2:
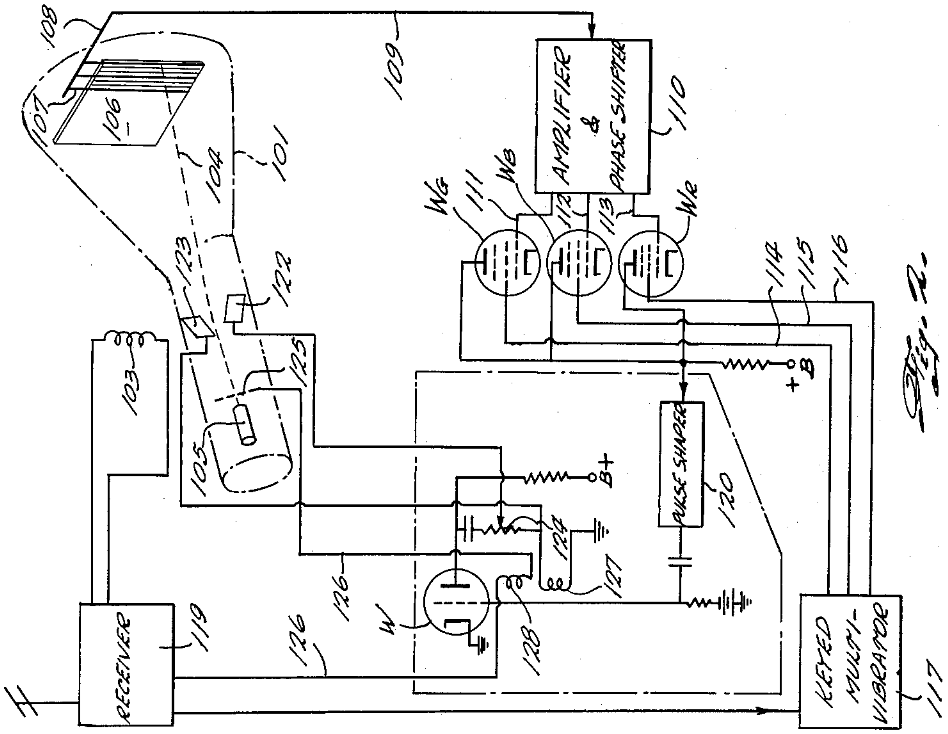
Figure 2 is a schematic of a receiving system also embodying the invention in a preferred form.

The receiving system will comprise video receiving circuits of generally conventional type indicated in block diagram form at 119 in Figure 2 of the drawing, together with color synchronizing equipment generally similar to that used in the transmitter. The picture tube is indicated schematically at 101, the line sweep of the electron beam 104 from cathode 105 being produced by the deflection coil 103. The phosphorescent screen 106 has associated with it grid elements 107 connected to a common terminal 108, one such element being provided for each set of three color strips. The strips of a set are adapted to reproduce different colors either by selection of suitable phosphors or by use of suitable light filtering material, as more fully described in my above mentioned application. The voltage developed in the grid wires 107 by the electron beam passing across them is communicated through line 109 to an amplifier and phase shifter as in the transmitter, connections 111, 112 and 113 applying the output of the amplifier and phase shifter to control grids of the tubes W*r*, W*b* and W*g*. The signals applied to these grids will have the same phase relationships as in the case of the transmitter. The keyed multivibrators, indicated at 117, may be controlled by any suitable synchronizing signal taken from the receiver circuit 119 and produce pulses corresponding to the pulse produced by the corresponding element 17 in the transmitter. As in the transmitter, the tubes W*r*, etc., will produce output only when positive signal is applied to both grids. The output of these tubes is communicated through pulse shaper 120 to the control grid of the tube W, the output of which is applied to the beam controlling or stopping electrodes 122 and 123, so as to stop the beam on a desired strip for synchronizing the color reproduction with the color transmission. Transformer 127, 128 may be utilized to apply a blanking voltage to the grid 125 during the movement of the beam across strips corresponding to colors not to be reproduced. As in my above mentioned application, the video signal may be expanded in point of time so as to insure a video signal corresponding to desired color will be present during the scanning of the corresponding color strip of the screen.

While the invention has been described as applied to a line sequential system, it is not restricted to use with such system, but may be utilized with any of a variety of sequential systems as described more fully in my aforementioned application.

As will be apparent, the present invention permits the production of video signal during 90% or so of the time while still selecting colors in proper sequence, and thus permits the production of a stronger and more continuous image in contrast to most color systems, in which the time of production of the video signal is reduced in accordance with the number of colors being transmitted and received.

Figure 4:
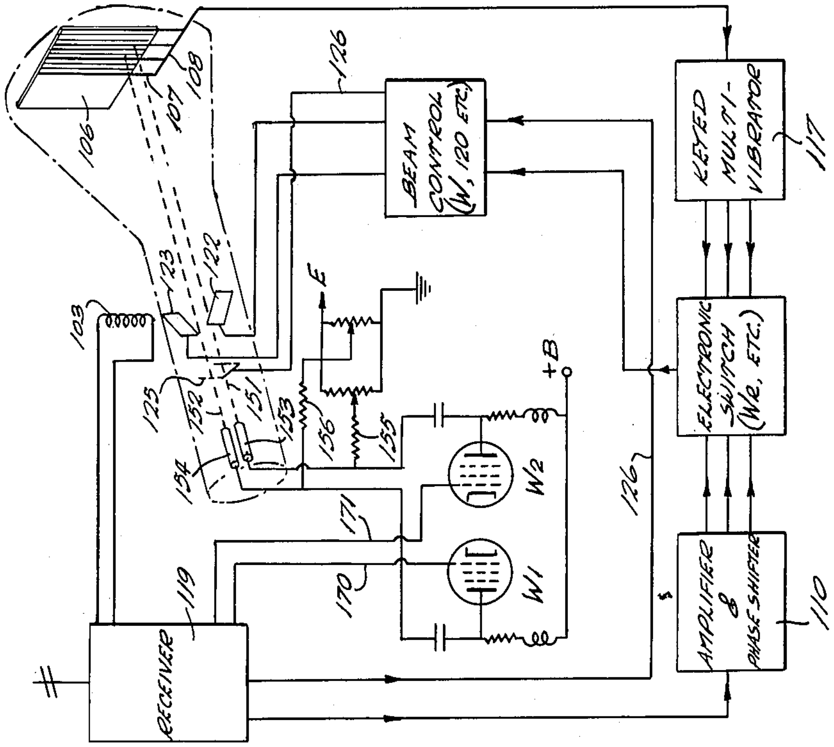
Figures 3 and 4 are schematics, respectively similar to Figures 1 and 2, but showing a modified form of the invention.
Figure 3:
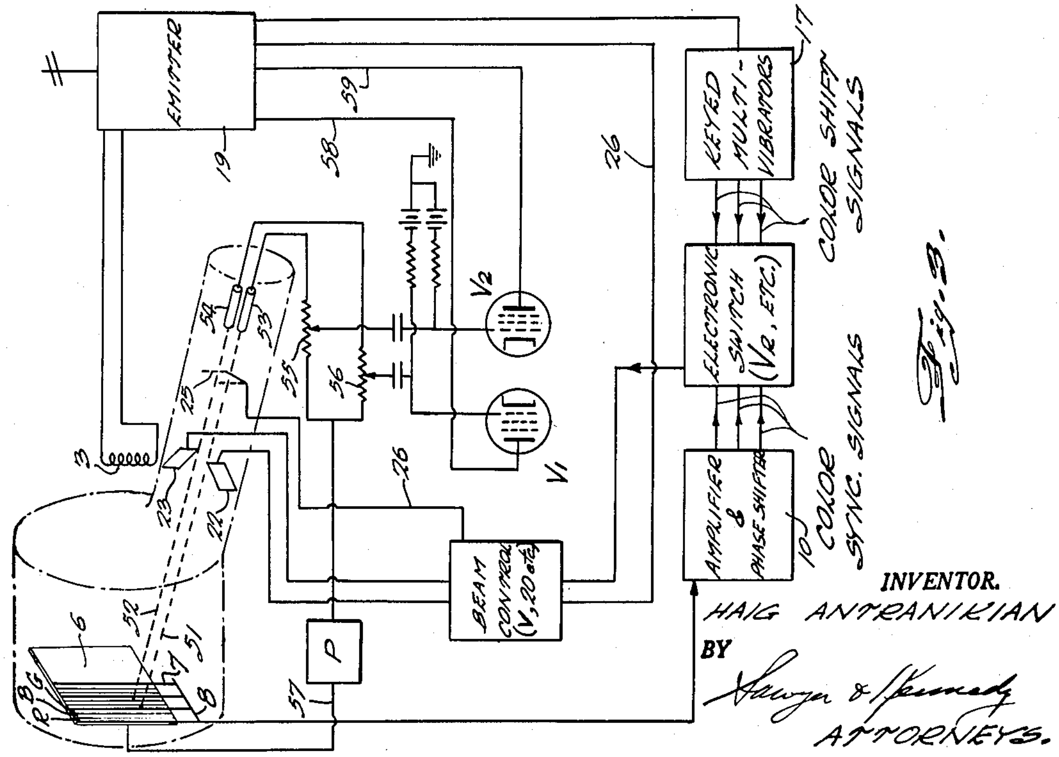

The system of the invention is also applicable to multiple gun tube transmission and reception, and a system embodying the invention in such form is shown in Figures 3 and 4.

The system is similar to that previously described, and in which two colors may be transmitted or received during the scanning of a line, the third color being omitted, but provides for scanning the two colors to be transmitted simultaneously instead of in succession. Apart from the arrangements which are made necessary, due to the fact that more than one electron beam is utilized, the system in the modified form of Figures 3 and 4 is similar to that previously described, so that it is necessary for a complete understanding of the invention merely to describe the modifications involved in adapting to multiple gun operation.

There is indicated in Figure 3 a camera tube or iconoscope, generally similar to that described in Figure 1, but having the photosensitive screen 6 in grid 7—8 containing a number of cyclically repeated strips for reproducing three component colors. The line sweep deflection may be accomplished by a deflection coil 3, as before, and similar auxiliary deflection electrodes 22 and 23, together with beam blanking grid 25, may be used. Two electron guns, the cathodes 53 and 54 of which are indicated, are provided for supplying the two electron beams 51 and 52, which may be spaced apart so as to scan two strips at a time. Conveniently, the first and third color strips may be scanned simultaneously, the electron beams being spaced apart so as not to scan the second color strip. The video output from conductor 57, shown as connected to the voltage divider indicated in block form at P, will, in general, be different with respect to the two cathodes, and the video outputs developed in the resistors 55 and 56 are applied to control grids of the two tubes V1 and V2, the output of which is fed to the emitter, indicated at 19, through lines 58 and 59. Transmission of the two video signals may be simultaneous, utilizing two carriers, or may be effected by a sampling system or in any other convenient way. The voltage developed in the grid wires 7 by the electron beams is communicated to an amplifier and phase shifter 10, as before, for generating three phase color synchronizing signals. Keyed multivibrators 17 controlled by the line sweep sawtooth or other convenient voltage are supplied, as before, and produce color shift signals for cyclically changing the colors to be transmitted. The electronic sweep combines the color synchronizing signals and color shifting signals, as before, and its output controls the beam control V, 20, etc., so as to stop the two beams 51 and 52 on a pair of strips for a certain time interval, and then move them rapidly to corresponding strips of the next set, the time required in this movement being only 10% or so of the total. A blanking pulse is also communicated to grid 25 through line 26, as before, and reduces the strength of the electron beam to a very small fraction of normal, so that beam strength sufficient to generate a signal in grid 7 may be maintained but the video output during movement of the beams will be negligible. As will be apparent, when more than three component colors are to be transmitted, a larger number of electron beams may be employed without essential change in the circuits and involving only the provision of an additional electron gun or guns and circuits for feeding the output thereof to the emitter.

The typical operation may be line sequential so that, for example, in scanning the first line the red and green strips are scanned, in scanning the second line the blue and red strips and in scanning the third line the green and blue strips, etc. Any desired field sequential, point sequential or other system may, however, be used, the color omitted varying cyclically instead of the color transmitted so varying.

The operation of the receiver will, in general, be clear from the foregoing description. The amplifier and phase shifter 110, electron switch W*r*, etc., keyed multivibrator 117 and beam control W120, etc. operate the same as the corresponding elements described in connection with Figure 3, and the picture tube is similar, except that two electron guns 153 and 154 for producing the two beams 151 and 152 are provided. The video output is applied to control grids of the tubes W1 and W2 through lines 170 and 171 and the output developed across the two resistance paths 155 and 156 is applied to the cathodes 153 and 154 for varying the beam strength of the two beams. Connection from the resistance network to the voltage divider is indicated at E. A blanking voltage is applied to grid 125 through line 126, as before, and suppresses the beams to a low value so as to produce negligible effect on the picture while still generating the synchronizing signal in the grid wires 107. The operation of the beams 151 and 152 in scanning the screen 106 will, of course, correspond to the operation of the beams 51 and 52 in the camera tube and will, hence, vary according to the type of scanning sequence employed.

Since the width of an individual color strip may be only about one third of the vertical width of a line being scanned, the image produced may be without sensible dot or screen formation, and in fact the fineness of screen structure may be far in excess of what is required. This being so, it is possible to diffuse the image somewhat in the horizontal direction so as to superpose and blend the colors, without sacrificing sharpness of image. Thus a thin screen interposed between the image screen and the viewer and having either rulings or a lenticular ridge formation parallel to the color strips may, in some cases, be used to advantage.

What is claimed is:

1. In a color television system, and in combination, a screen having a cyclically repeated plurality of sets of parallel strips, each set comprising strips corresponding in number and in predetermined order to a number of component colors to be reproduced, means for scanning the said screen by moving an electron beam transversely of the strips for successively scanning the lines, means responsive to the electron beam for generating a signal in timed relation to the scanning thereby of the strips, and color selecting means controlled by the said signal and operating to decrease the scanning speed of the beam over predetermined strips of the said sets.

2. The combination according to claim 1, comprising also means responsive to the electron beam for suppressing the video signal during the passage of the beam over the remaining strips of the sets.

3. The combination according to claim 2, in which the means for suppressing video signal comprises means for blanking the beam.

4. The combination according to claim 1, comprising means for so generating and controlling the movement of a plurality of electron beams for scanning a corresponding plurality of strips simultaneously.

5. In a color television system, and in combination, a screen having a cyclically repeated plurality of sets of elemental picture areas, each set comprising sets of elemental picture areas corresponding in number and in predetermined order to a number of component colors to be reproduced, means for scanning the said screen by moving an electron beam across the same along a succession of lines, each of which follows a predetermined path and crosses the elemental picture areas of a succession of such sets, which areas correspond to a predetermined component color, in order and also intermediate areas not corresponding to the said predetermined component color, means responsive to the electron beam for generating a signal in timed relation to the scanning thereby of the sets of elements, and color intensifying means controlled by the said signal and operating to decrease the scanning speed of the beam over the elements corresponding to a predetermined component color and to increase the scanning speed of the beam in its passage between elements, while confining the scanning movement of the beam to the predetermined path.

6. The combination according to claim 5, comprising also means responsive to the electron beam for suppressing the video signal during the passage of the beam over the remaining elements.

7. The combination according to claim 6, in which the means for suppressing video signal comprises means for blanking the beam.

8. The combination according to claim 5, comprising means for so generating and controlling the movement of a plurality of electron beams for scanning a corresponding plurality of sets of elements simultaneously.

9. In a color television system, and in combination, a screen having a cyclically repeated plurality of sets of elemental picture areas, each set comprising sets of elemental picture areas corresponding in number and in predetermined order to a number of component colors to be reproduced, means for scanning the said screen by moving an electron beam across the same for successively scanning the lines, and color selecting means operating to decrease the scanning speed of the beam over the elements corresponding to a predetermined component color.

References Cited in the file of this patent

UNITED STATES PATENTS

| | | |
|---|---|---|
| 2,431,115 | Goldsmith | Nov. 18, 1947 |
| 2,490,812 | Huffman | Dec. 13, 1949 |
| 2,545,325 | Weimer | Mar. 13, 1951 |
| 2,587,074 | Sziklai | Feb. 26, 1952 |
| 2,621,245 | Kell | Dec. 9, 1952 |
| 2,634,326 | Goodrich | Apr. 7, 1953 |
| 2,644,855 | Bradley | July 7, 1953 |
| 2,681,381 | Creamer | June 15, 1954 |
| 2,689,269 | Bradley | Sept. 14, 1954 |